A. C. DODARD.
INSECT TRAP.
APPLICATION FILED AUG. 5, 1912.
1,059,934. Patented Apr. 22, 1913.
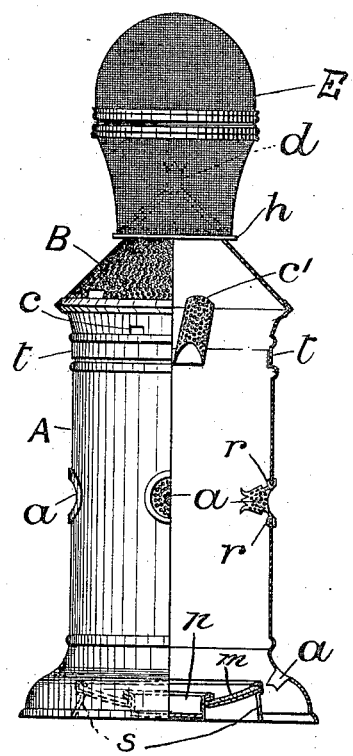
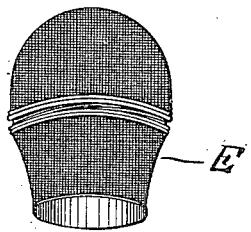
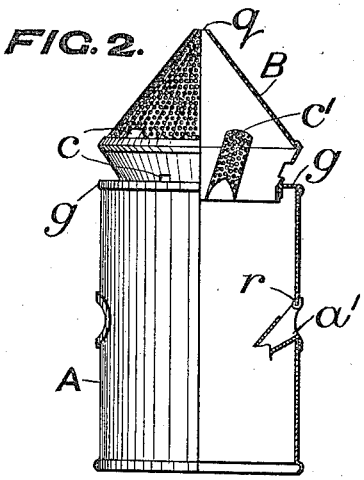
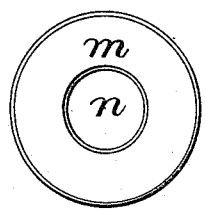
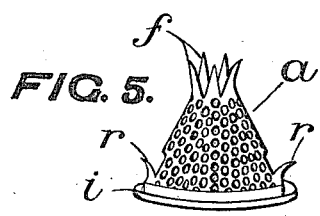
Inventor
Alexander C. Dodard

UNITED STATES PATENT OFFICE.

ALEXANDER CONSTANT DODARD, OF MARNHULL, ENGLAND.

INSECT-TRAP.

1,059,934. Specification of Letters Patent. Patented Apr. 22, 1913.

Application filed August 5, 1912. Serial No. 713,436.

*To all whom it may concern:*

Be it known that I, ALEXANDER CONSTANT DODARD, a citizen of the Republic of France, residing at The Presbytery, Marnhull, Dorset, England, have invented certain new and useful Improvements in Insect-Traps, of which the following is a specification.

This invention relates to apparatus for trapping wasps, bees, flies, moths, beetles, mosquitos and similar insects and has for its object an improved construction of trap.

Insect traps of various constructions are already known; some are composed of one compartment, some of several, nearly all make use of liquid bait to attract the insects, some use mirrors placed over their entrances. Others use artificial light, at night, which while making them appear a luminous whole leaves their entrances rather in the shade.

Experience has shown that the flying and humming of imprisoned insects, especially when taking place in a chamber well illuminated internally and possessing high resonating powers, becomes a very important factor to attract other distant insects thereto; and that light, natural during daytime, artificial at night, when used in a special manner, causes and promotes activity among the imprisoned insects and serves to attract others.

The present invention has therefore been designed and constructed to make use, besides bait, of the aforesaid factors.

Accordingly it comprises a trap of the kind specified composed of one, deep, roomy, resonant, rooflit chamber with its inner walls polished or enameled white and provided at its bottom with a concave mirror. This chamber is made of two detachably connected parts, the lower of which, composed preferably of opaque material of any suitable kind, is fitted with a series of conical entrances, and the upper part consists of a kind of rooflike top of reticulated or perforated metal, glass or like material which is fitted with a series of passage-like entrances and is also provided at its apex with a conical passage leading into a detachable collector.

The invention will be described with reference to the accompanying drawings in which:

Figure 1 is a front elevation, partly in section, of the complete trap, with the collector in its place on the top thereof. Fig. 2 is a detail front elevation, partly in section, of the trap chamber. Fig. 3 is a detail view of the inverted cone shaped bottom of the collector. Fig. 4 is a detail view of the upper part of the collector. Fig. 5 is a detail view of an enlarged entrance. Fig. 6 is a plan view of a concave mirror for the bottom of the chamber.

The trap chamber, Fig. 2, is composed of two detachably connected parts A and B, the part A being a bait chamber, and the part B a rooflike top. The part A is a deep hollow roomy body made with (Fig. 1) or without (Fig. 2) a foot base in round, oval or other suitable shape preferably of opaque material and receiving light chiefly from its more or less open, upper end. This body is intended to hold the bait which consists of sweet liquid or the like, and to provide with the part B ample room to enable insects to fly therein; to act as resonator and intensify the humming of the insects therein; and to receive at its bottom, when desired, a mirror, $m$ Fig. 6 made concave in shape and having a central opening $n$ to receive a bait holder, cup or saucer or the like. Said mirror rests upon supports, such as short pieces of wires or the like, so as not to deaden the resonance of the chamber. The mirror has for its object to reflect the light received from above against the inner surface of the wall of the chamber to concentrate and increase the same, with a view to promoting a greater activity among the imprisoned insects, and also to reflect insects' own likenesses to induce those at the entrances to enter more readily into the trap.

The part A is provided with a series of entrances, $a$, placed where convenient. These entrances, $a$, composed of reticulated metal, glass or such like material, are of substantially frusto-conical shape, Fig. 5, each cone having its base provided with a flange, $i$, and its apex with deep serrated sections, $f$, which make exit difficult and permit adjustment of the apex aperture by bending the sections in or out, at will. Some short tongues $r$ are partly cut out of the cone, and intended to be used to fix each cone in position. These entrances may be fitted in a more or less slanting way as indicated by the reference character $a^1$, fixed permanently by means of solder or rivets, or more conveniently inserted removably from the outside, their flanges resting against the external walls of the body and being clipped in position from inside by means of the tongues, r, or by a rubber ring slipped over the smaller end of the cone.

The part B, or roof-like top, is of substantially conical shape and is constructed of reticulated metal, glass or other suitable material. It is fitted at its lower end on a rim t and is provided at its apex with a conical passage q leading into a collector E placed above it, and it is also provided with a series of entrance apertures c which are punched either in the rim or in the reticulated top itself. From these apertures lead downwardly directed passages formed by half-tubular shields $c^1$ of reticulated metal, glass or suitable material which are fixed on the inside of the rim and have their lower ends cut and protruding a short distance from the inner surface of the chamber wall, Fig. 1.

Part B is connected to part A, by fitting its rim t either over the upper end of the latter, or in a rim, g, which forms a kind of circular gallery or footing for insects to alight on near the entrances, c. Part B has for its objects, to provide room, with part A, for insects flying therein, to admit light into the latter part, to draw insects from the bottom upward, to keep them flying while searching for a way out, and finally to compel them to converge from all directions to outlet, q, leading to the collector.

The collector E is placed upon the top B of the trap chamber, as shown in Fig. 1 and is intended to collect the caught insects, and to render their removal and destruction possible and easy without interfering with the working and baiting of the trap. It simply rests upon the apex of top B, so that it can be easily removed from its place, and the outlet q corked. Insects can be scalded or destroyed otherwise, their bodies cleared away, and the collector replaced at leisure. This collector can be made of various shapes, more conveniently in a spherical form opening into two halves, composed of reticulated metal, glass or like material. The lower part is fitted with a cone k of perforated metal or the like which may be made detachable or fixed, at h, Fig. 3, and Fig. 1, and which is provided with an aperture at the top, in which fits a short tube, d, with its upper end serrated to prevent exit of insects. This cone k fits tightly over the apex of top B, the outlet q of which latter registers with tube d and thus forms a clear passage to the collector.

The said trap may be made in various sizes and more or less ornamented.

What I claim is:—

1. An insect trap comprising a cylindrical bait chamber having ingress apertures for the insects; a mirror disposed within said chamber and having a central bait-receiving cavity; and a perforated top mounted upon said chamber.

2. An insect trap comprising a cylindrical bait chamber of resonant material having ingress apertures for the insects; and a mirror disposed within and at the bottom of said chamber and having a central bait-receiving cavity.

3. An insect trap comprising a cylindrical bait chamber having ingress apertures for the insects; a mirror disposed within and at the bottom of said chamber; and a perforated top mounted upon said chamber.

4. An insect trap comprising a cylindrical bait chamber having ingress apertures for the insects; a perforated top mounted upon said chamber; and a mirror disposed within said chamber in position to reflect against the inner surface of the chamber wall the light received through said apertures and the perforations in said top.

5. An insect trap comprising a cylindrical bait chamber of resonant material having apertures for the ingress of insects; a mirror, having a central cavity, disposed within and at the base of said bait chamber; a detachable conical reticulated top mounted upon said bait chamber and having apertures for the ingress of insects; and a detachable reticulated collector disposed above said top and provided with a conical base of reticulated material adapted to fit over the apex of the top, said base having a part thereof affording a means of communication between said collector and said bait chamber.

6. An insect trap comprising a cylindrical bait chamber of resonant material having conical inlet passages of reticulated material disposed within its wall; a detachable top mounted upon said bait chamber and provided with semi-circular, downwardly extending inlet passages of reticulated material disposed inwardly thereof, and with a circular exit passage; a conical base of reticulated material adapted to fit over the apex of said top, and provided with an exit passage communicating with the first-named exit passage; and a two-part spherical collector, one part of which is adapted to engage with the other part, said detachable base being arranged to extend into said collector.

In testimony whereof I have hereunto set my hand in presence of two subscribing witnesses.

ALEXANDER CONSTANT DODARD.

Witnesses:
 JOHN COODE WARD,
 HARRY JOHN STOGDEN.

Copies of this patent may be obtained for five cents each, by addressing the "Commissioner of Patents, Washington, D. C."